US006648221B2

(12) United States Patent
Thawley et al.

(10) Patent No.: US 6,648,221 B2
(45) Date of Patent: Nov. 18, 2003

(54) POLARIZER BASED DETECTOR

(75) Inventors: Jeffrey T. Thawley, Claymont, DE (US); Edward M. Zoladz, Jr., West Chester, PA (US); Philippe S. Jard, Downingtown, PA (US); David C. Deaville, West Chester, PA (US); Bernard Bouchet, Monnetier (FR); Jerome Daout, Nyon (CH); Robert Clauser, Columbus, NJ (US); Michael D. Nunn, West Chester, PA (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 10/000,627

(22) Filed: Nov. 30, 2001

(65) Prior Publication Data

US 2002/0084406 A1 Jul. 4, 2002

Related U.S. Application Data

(60) Provisional application No. 60/250,803, filed on Dec. 1, 2000.

(51) Int. Cl.[7] ................................................ G06F 17/60

(52) U.S. Cl. ........................................................ 235/379

(58) Field of Search ................................. 235/379, 380, 235/439, 454; 902/7, 8, 11, 12, 15, 16; 149/203, 206, 207

(56) References Cited

U.S. PATENT DOCUMENTS

| | | | | | |
|---|---|---|---|---|---|
| 4,379,634 | A | * | 4/1983 | Rosenthal | 356/246 |
| 4,565,275 | A | | 1/1986 | Hagiwara | |
| 4,896,901 | A | * | 1/1990 | Ekelund | 283/70 |
| 5,067,604 | A | | 11/1991 | Metcalf | |
| 5,383,546 | A | | 1/1995 | Mulder | |
| 5,485,906 | A | | 1/1996 | Newton et al. | |
| 5,632,367 | A | | 5/1997 | Bergeron et al. | 194/207 |
| 5,806,649 | A | | 9/1998 | Walsh et al. | |
| 5,892,239 | A | * | 4/1999 | Nagase | 250/225 |
| 5,988,345 | A | | 11/1999 | Bergeron et al. | |
| 6,044,952 | A | * | 4/2000 | Haggerty et al. | 194/207 |
| 6,441,891 | B1 | | 8/2002 | Levasseur et al. | 356/71 |

FOREIGN PATENT DOCUMENTS

EP 716400 A1 * 6/1996 ............. G07F/1/04

* cited by examiner

*Primary Examiner*—Diane I. Lee
(74) *Attorney, Agent, or Firm*—Fish & Richardson P.C.

(57) ABSTRACT

Apparatus and method for detecting strings attached to bills or other forms of payment in a currency validator. In one implementation a string fraud detector uses polarized light to detect a string. In another implementation, polarized light and light in a different range of wavelengths are used to detect a string.

54 Claims, 11 Drawing Sheets

POLARIZER BASED DETECTOR

This application claims priority from copending U.S. Provisional Application No. 60/250,803 filed on Dec. 1, 2000.

BACKGROUND

A bill validator typically includes a bill path and a transport system for guiding the bill past a recognition sensor area and then to a stacking area where the bill is stored in some sort of cash box. Such validators typically include a system to prevent fraud. In one type of fraud, the thief uses a string connected to a bill to retrieve the bill after authentication and still receive a product or service. These “strings” are mechanical attachments to the bill, which can be manipulated externally. Such strings may take many forms including wires, tapes, extruded materials and the like. This kind of fraud is typically known as a ‘string cheat’.

Various solutions have been used to solve the string cheat problem. For example, systems have been designed to thwart string cheating by detecting the presence of pull strings optically or mechanically, by preventing a shutter from closing, or by using some form of unidirectional or actively controlled mechanical arrest. Optical detection of strings has been challenged by the use of finer transparent strings.

SUMMARY OF THE INVENTION

Presented is a polarizer based detector for a currency validator. An embodiment is a string detector that includes a string fraud detection means arranged along a transport path of the validator, wherein polarized light is used to detect the string.

Implementations of the invention may include one or more of the following features. The string fraud detection means may include at least a light source and at least a photo detector, and the photo detector may be a polarized detector means. The light source may be a laser diode, and may be composed of at least an LED and a polarizer or may include two polarizers, which may be linear polarizers or circular polarizers. If circular polarizers are used, one polarizer may be right-handed and the second may be left-handed or the two polarizers have the same handedness. The axis of the two linear polarizers may be crossed at substantially 90° and the axis of the polarizers may be oriented substantially at 45° to the transport path. The polarizers may be active in a limited range of wavelengths, and may be active in the visible wavelength range and inactive in the IR wavelength range. The string fraud detection means may include at least a light source, a detector and at least one polarizer means on one side of a transport path and a mirror on the opposite side, such that polarized light is reflected towards the detector through the polarizer. The string fraud detection means may include a plurality of light sources and polarizing means, wherein at least one source has a wavelength in a range that is polarized and at least a second light source has a wavelength in a range that is not polarized. The transport path may include at least one transparent window, and the transparent window may be made of at least one of PMMA, cycloaliphatic acrylic, optical grade acrylic (PMMA), allyl diglycol carbonate, modified urethane and glass. An optical subassembly may form the transparent window, and the optical subassembly may include a frame molded around a rectangular glass insert, wherein the frame may be formed of a low shrink material. The optical subassembly may be loaded as an insert into an injection mold tool that forms a portion of the transport path, and grooves may be formed in a portion of the transport path near the location of the optical subassembly to absorb stress due to mold shrinkage. The transport path may include at least one window element and polarizer component. The polarizer based detector may include sensor means, validation means, comparison means and associated memory means.

Another aspect of the invention includes a method for detecting a transparent string in a currency validator. The technique includes illuminating the string with polarized light, and detecting the polarized light using at least a photo detector and at least a polarizer, wherein the polarization of the light is rotated through the string.

Implementations of the method may include one or more of the following features. The technique may include detecting the rotated light by transmission through a polarizer, or detecting the rotated light by absorption by a polarizer. Polarized light in a limited range of wavelengths may be used to detect a transparent string, and opaque strings may be detected with light in another range of wavelengths. Transparent string may be detected in the visible wavelength range and the opaque string may be detected in the IR wavelength range, and a signal may be measured to detect the presence of a string and/or the signal may be compared to a reference value stored in memory. The measured signal may be compared to a signal in absence of a string by comparing the ratio of the measurements to a reference threshold. The technique may further include determining a baseline signal value by measuring a signal in the absence of a string, storing the baseline signal value in a memory, determining a foreign object signal value by measuring a signal when a foreign object is detected, obtaining a difference value by subtracting the foreign object signal value and the baseline value from each other, and comparing the difference value to a reference value stored in the memory. In addition, the method may include determining that a substantially transparent string has been detected if the difference value is positive, and detecting that a substantially opaque string has been detected if the difference value is negative. The reference value may be defined by statistical measurement of a plurality of measurements, in the presence or in the absence of the string, computing a mean value and a standard deviation, and defining a reference value substantially equal to the mean value + or − n standard deviations, and n may be between 0 and 5.

The details of various embodiments of the invention are set forth in the accompanying drawings and the detailed description. Other features and advantages of the invention will be apparent from the description and drawings, and from the claims.

BRIEF DESCRIPTION OF THE DRAWINGS

FIGS. 16*a* and 16*b* show the use of a spherical mirror 37 as a reflector to focus the beam onto a focal point 39 suitable for the placement of a detector, after reflection across the transport path on another flat mirror 38, wherein FIG. 16*a* shows a horizontal ray tracing and FIG. 16*b* shows the vertical ray tracing.

Like reference numbers in the various figures indicate like elements.

DETAILED DESCRIPTION

Figure 1:
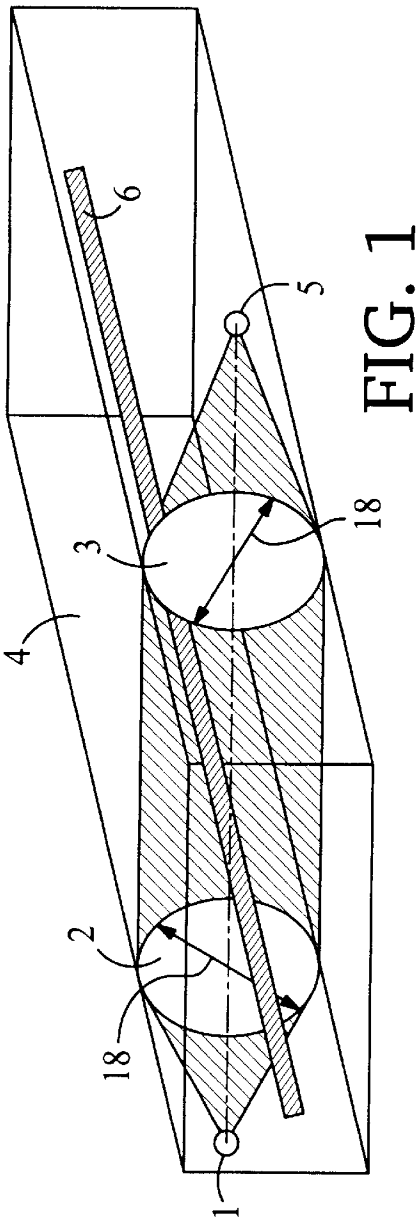
FIG. 1 is a sketch of a bill path 4 and the arrangement of two opposing polarizers 2 and 3, a source 1 and a detector 5 according to an implementation of the invention.

The present invention pertains to improvements in the optical detection in currency validators of strings attached to currency, especially in the case of very fine strings. It has been noticed that such fine transparent polymer string exhibits a birefringence effect that can be detected by using two polarizers. As shown in FIG. 1, a light source 1 such as an LED is placed on a first side of the two opposing polarizers 2 and 3 that are on opposite sides of a bill path 4, and a photo detector 5 is placed on the second side in order to measure the light transmitted through the two polarizers. A string 6 is shown, and the general effect of the configuration is that the birefringence in the string 6 exhibits an improved contrast. Depending on the type of polarizers used, linear or circular, and their relative arrangement, the contrast is a darkened string on a clear background or a bright appearing string on a dark background. It should be understood that the term "string" used herein refers to any type of means that may be attached to currency including, but not limited to threads, wires, films, tapes, extruded material line, polymer line and the like. It should also be understood that the term currency may mean bills, banknotes, security documents, coins, tokens or other forms of payment.

Use of Linear Polarizers

Two arrangements of the polarizers 2 and 3 are of interest. In a transmissive mode, shown in FIG. 2, the two polarizers have the same parallel orientation. In the transmissive arrangement of the polarizers, the polarized light from the first polarizer goes through the second polarizer but the portion of polarized light that goes through the string is rotated and blocked by the second polarizer, increasing the contrast and visibility of the otherwise transparent string.

Figure 3:
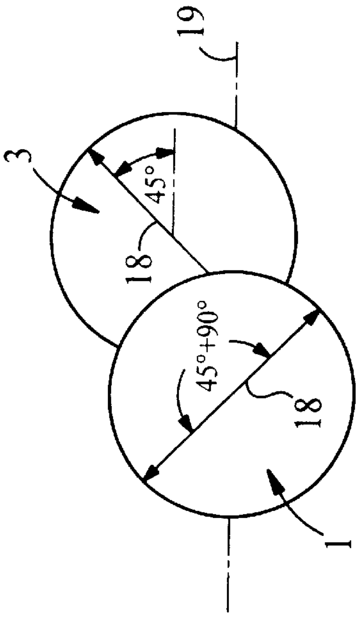
FIG. 3 shows the relative arrangement of two polarizers 2 and 3 in blocking mode with their fast axis 18 being substantially perpendicular to each other.

In a blocking mode, as shown in FIG. 3, the fast axis of the two polarizers are crossed at a substantially 90° angle from each other. When a string is inserted between the two polarizers, the plane of polarization of the light from the first polarizer that goes through the string 6 is rotated, similarly to the effect of a ¼ wave retarder plate.

In the blocking mode, the polarized light from the polarizer 2 is normally blocked by the polarizer 3 oriented at 90°, but the portion of the polarized light going through the string 6 is rotated and therefore is not blocked by the polarizer 3 and therefore causes a transmitted signal to be generated. This "blocking" arrangement is particularly suitable because of the higher signal to noise ratio it allows, going from a low dark signal in the absence of a string (background residual light), to a bright signal that comes only from a string. This signal to noise ratio is easier to detect than the relatively low absorption of a small object over a bright background that takes place in a transmissive arrangement.

Figure 2:
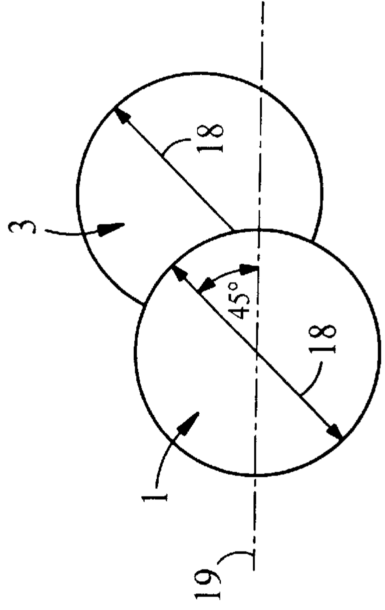
FIG. 2 shows the relative arrangement of two polarizers 2 and 3 in transmissive mode with their fast axis 18 being parallel and their orientation being at substantially 45° to the transport path axis 19.

It has been found that the maximum contrast and visibility of the string occurs when the string 6 is substantially oriented at substantially 45° from the axis 18 of the polarizers. Therefore, the optimal arrangement of the polarizers is such that the main direction of the transport axis 19 is oriented at substantially 45° to the axis 18 of the polarizers as shown in FIGS. 2 and 3.

A string detection criteria may be based on the detection of the change in signal intensity compared to a threshold as a reference value. Either a simple absolute threshold can be used or conveniently, to accommodate for temperature drift, a ratio of the signal in the presence of a string to the signal in the absence of a string, or its inverse, can be used.

When two polarizers are crossed at substantially 90°, in practice the extinction ratio depends on the type of polarizing material used and may not be perfect, leaving a residual background offset signal. It may be convenient to measure and store in a memory this remaining background signal in the absence of the string as a base line value, and to compute a signal variation by subtracting the base line value from the measurement when a string is present. A comparison can then be made of the variation of the signal to a threshold. Although not optimal, the presence of a background offset signal can also be used to detect opaque strings that would cause the signal variation to be negative instead of positive as with a transparent string. The optimum threshold can also be determined based on statistical measurements of the signal in both conditions. For example, the signal may be repeatedly measured in a pre-defined condition and a statistical model may then be defined, for example Gaussian, and the threshold is defined by the using the mean value +/− n standard deviation, where n can be conveniently in the range of 0 to 5, typically 3. The comparison means can advantageously be in the form of a microprocessor comparing the measurements to a reference value stored in a memory or alternatively, simple comparator hardware in classical analog or digital form can be used. Conveniently, when a microprocessor is used, the measurements are converted from the analog domain to the digital domain using an A/D converter.

A particular advantage of the configuration where the rest state is a dark field is that the impact of dirt in the bill path on the sensitivity of the sensor is minimal. Opaque matter such as dirt will generate no signal in this configuration.

It has also been noticed that light from a laser is substantially polarized, therefore it is possible to use a laser as a polarized source and only one polarizer on the detector side. In this implementation, the polarizer is oriented in order to minimize the signal on the detector in the absence of the string. If the laser is a solid state type, it might be difficult to obtain a stable orientation of the die and the plane of polarization. In this case, the polarizers could be oriented relative to the beam, instead of to the transport path. It will be evident that similar considerations can take place for an arrangement when considering the use of the absorption mode in the string. In that case, the polarizer is oriented to maximize the signal in the absence of the string.

Figure 10:
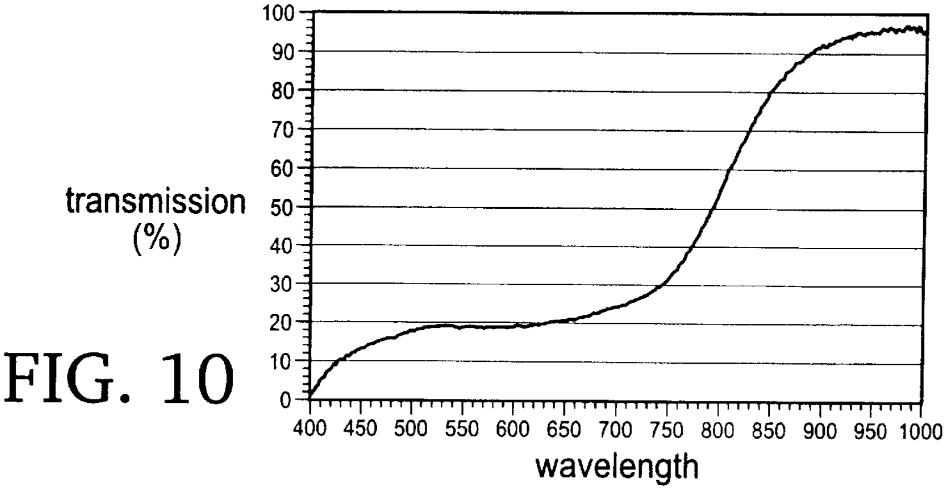
FIG. 10 shows the transmission spectral response of a linear polarizer, wherein the curve shows that the polarizer becomes substantially transparent in the infrared wavelength range.
Figure 11:
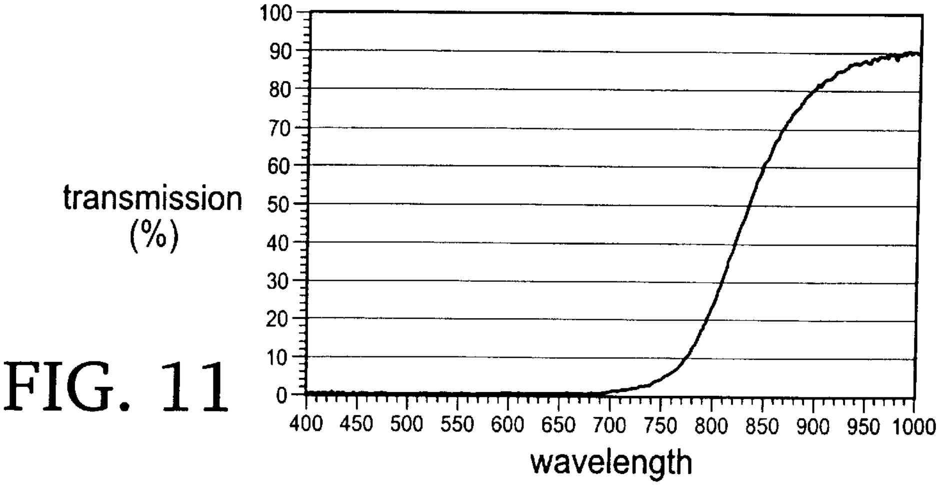
FIG. 11 shows the spectral response of two linear polarizers crossed at substantially 90°, wherein the curve shows the percentage absorbance in the visible range and that the polarizers become substantially transparent in the infrared range.

Polarizing filters such as HN Polaroid® films are active for a limited range of wavelengths. For example, films acting in the visible wavelengths tend to become transparent in the infra-red (IR) domain as shown in the spectral response graphs of FIGS. 10 and 11. This property implies that to be polarized, the wavelength of the source must be in a specific range, for example the visible range. It should be understood, however, that other materials such as liquid crystal display (LCD) and dichroic crystal materials could be used to form polarizer means. Further, some of the contemplated polarizer materials or means may be operable to turn On and Off in response to electrical signals, or otherwise be able to modify their polarizing ability.

The above arrangement using crossed polarizers in blocking mode is suitable to detect transparent strings, but it is not that suitable to detect opaque strings, because in order to maximize the signal change, it is desired to minimize the signal in the absence of string. Therefore, since the signal in the absence of string is low, it becomes even lower when an opaque string is presented and may become buried in the noise and become unusable in practice. Interestingly, the fact that polarizers are transparent in the IR wavelength range allows the same geometry of the optical system to be used to detect an opaque object in the IR domain. Therefore it is convenient to use a dual wavelength light source, one in the visible range that gets polarized, and one in the IR range, at approximately a wavelength of 950 nanometers (nm) for example, that is not polarized.

The converse of the above may also be possible when an IR polarizing film is used that would be non-polarizing in the visible range. However, in the case of the use of a polarizer using the transmission mode, because the signal change works by absorption for all types of objects, there is no need to use a dual wavelength arrangement. In the case of a transparent object, the absorption signal is due to the phase rotation and in case of an opaque object, it is due to the absorption of the object itself.

In the above configuration variations, the proposed light source is made using one or several LEDs, but a broad band incandescent light bulb could be used. A multi-pellet LED array can also be used where several dies of different wavelength are included in a single package.

Common Mode Rejection of Noise

In the case of the foregoing system, which detects a signal both by absorption in the non-polarized domain and rotation in the polarized domain, it is possible to compare the two signals to get information that is not easily detected in a single signal device. In particular, the signal processing system can look for correlated changes in signal levels. For example, a fine string that casts a weak shadow or negative signal in the non-polarized domain may emit a weak glow or positive signal in the polarized domain. By looking for a correlation between the signals it may be possible to detect with greater certainty signals that would be too weak to be reliable if used alone. Such processing may be achieved either by using classical electronic analog hardware or in the digital realm by using an A/D converter.

Use of Circular Polarizers

Circular polarizers are made by associating a linear polarizer film with a 90° retarder film with its fast axis oriented at +/−45°. Usually the two components are laminated to comprise a film but it is possible to keep the elements separated. When two circular polarizers are placed face-to-face, the retarder facing each other, the light from the source goes successively from a random polarization to a linear polarization, then to a circular polarization, then back to a linear polarization. Inserting a string between the polarizers in the area of circular polarization creates an extra retardation of the light that goes through the birefringent string that generates a contrast.

Circular polarizers can be designed to produce right-handed or left-handed light depending on the orientation of the retarder plate relative to the linear polarizer. When two circular polarizers of the same type are used, the light is normally transmitted and the string is darker and detected by absorption of the light going through the string that is extra phase shifted. If one polarizer is of the left-hand type and the other of the right-hand type, the light is normally blocked and a string is detected by transmission of the light going through the string that is extra phase shifted. The advantage of circular polarizers is that the string is detected in any orientation relative to the polarizer, and precise relative orientation of the two polarizers is not required. A disadvantage is that the phase shift in the retarder plate is wavelength dependent, therefore, better contrasts may be achieved by using a monochromatic source. Standard polarizers are usually designed to work in the green domain.

In another arrangement, two circular polarizers of the same chirality (handedness) can be used when a specular reflection on a mirror surface is inserted in the path of light before reaching the second polarizer. In this arrangement, the detector and the source are on the same side of the bill path and the mirror is located on the opposite side.

Considerations of Bill Path Windows

Figure 4A:
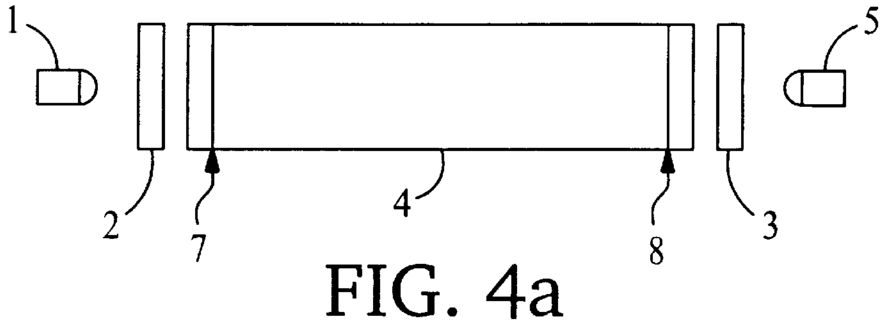
FIG. 4*a* is a front view of the transport path 4 and the two transparent windows 7 and 8 on each side, with two linear polarizers 2 and 3 located behind the windows and a light source 1 and photo detector 5.

Referring to FIG. 4*a*, in the context of a bill validator, it is advantageous to fabricate the transport path 4 using a double shot process to include transparent windows 7 and 8 and to create a water sealed path. However, transparent windows may cause a problem in the case of circular polarizers as they may also behave as retarder plates and overcome the effect of the string itself. Such practical problems in implementing such a solution have led to the use of linear polarizers.

Regarding circular polarizers, in theory the retarder plate necessary to create a circular polarizer from the combination of a linear polarizer and a ¼ wave plate could be the transparent window 7 and 8 sections of the bill path 4 formed in a housing portion 52 (see FIG. 4*c*) as shown in FIG. 4*a*, providing the necessary birefringence effect can be controlled by the injection process.

Regarding linear polarizers, the transparent windows 7 and 8 of FIG. 4*a* would have to be injected in a way to minimize stress so that any birefringence effect is such that it is homogeneous and the fast axis is either parallel or perpendicular to the fast axis of the linear polarizers 2 and 3. Acrylic, a polymer which is also known as Poly-Methyl-Methacrylate or PMMA, has been identified as a suitable polymer for that purpose. Other materials such as Optorez™, a cycloaliphatic acrylic material marketed by the Hitachi Chemical Company, may be used. Several other materials having low birefringence characteristics may be suitable for use in fabricating an optical window. Such materials could include Optical grade Acrylic (PMMA), such as DQ501® material manufactured by Cyro Industries, Allyl Diglycol Carbonate (ADC) such as CR-39® manufactured by Pittsburgh Plate Glass, and modified urethane material manufactured by Simula Polymer Systems Inc. of Phoenix, Ariz., and all grades of glass may be potentially useful such as Schott® BK-7 glass.

Figure 4B:
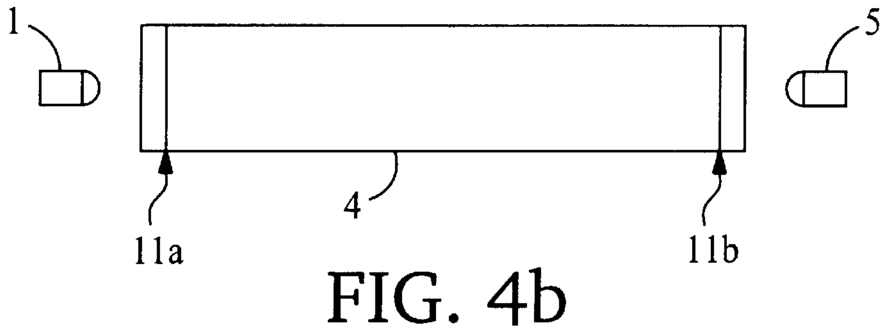
FIG. 4*b* is a front view of the transport path 4 and two circular polarizers 11*a* and 11*b* directly forming the transport windows, with a light source 1 and photo detector 5.

FIG. 4*b* illustrates another possible implementation, wherein polarizer elements 11*a* and 11*b* have been inserted as separate parts in the chassis so that they become the windows. Such a solution may not be suitable because bumps may be fabricated at the junction points in the transport path, which increases jam risks.

Figure 4C:
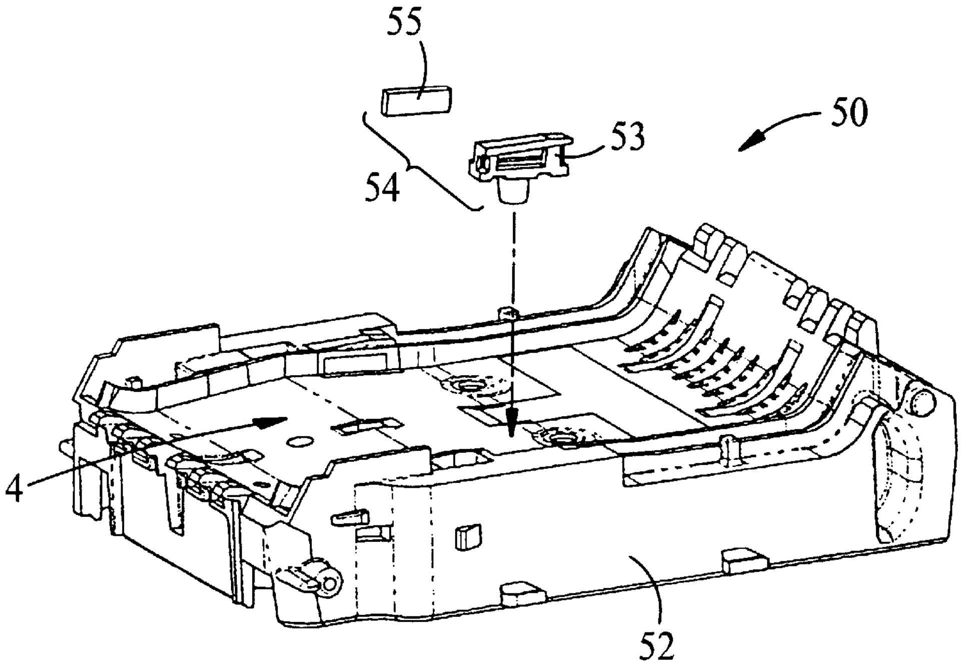
FIG. 4*c* is a partially exploded view of a portion of a bill validator housing including a window subassembly.

FIG. 4*c* is a partially exploded view 50 of a portion of a bill acceptor housing or chassis 52 and window sub-assembly 54. The housing portion 52 may form the bottom half of the bill path 4 and includes a portion for seating the window sub-assembly 54.

In an implementation, an injection mold tooling process is utilized with a glass window. Referring again to FIG. 4C, a frame 53 is molded around a rectangular glass insert 55. The resulting window subassembly 54 is then loaded into a second injection mold tool that forms the housing portion 52. The frame 53 serves as a buffer between the window insert 55 and the bill path 4. A very low shrink rate and high modulus resin may be used to surround the glass. A suitable material for the frame is a liquid Crystal Polymer (LCP) material, for example, Vectra® by the Ticona Company which is a business division of Celanese AG. The very low shrink rate and stiff frame protects the glass insert from stress induced by the shrinkage of the housing molding (which may be a glass filled Polycarbonate material e.g. GE Lexan®). Conceivably, a soft material might serve the same purpose in the same manner as glazing putty used in traditional house window frames.

Figure 4D:
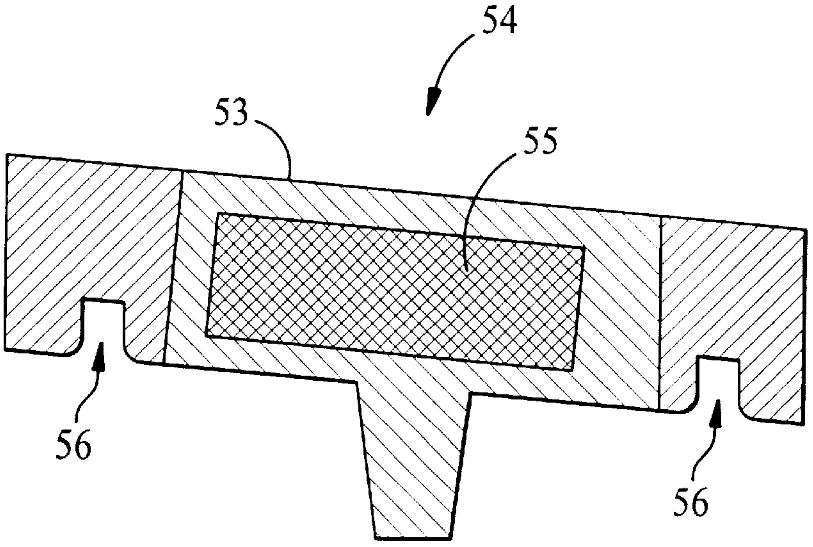
FIG. 4*d* is an enlarged, cross-sectional view of an implementation of a window subassembly including a frame surrounding a window.

Notwithstanding such precautions, sufficient residual stress may still occur in the glass window to cause an unacceptable level of bi-refringence. A further reduction in molding stress around the window frame may be achieved by including flow restriction grooves around the part to be protected. FIG. 4*d* is an enlarged, cross-sectional diagram view of the glass window 55 surrounded by a frame 53. The frame subassembly 54 is surrounded by the housing portion or chassis 52 (shown partially). The housing 52 includes a groove 56 running around 3 sides of the frame (shown in two locations in the cross-section). The effect of this groove is to reduce the flow of plastic against the frame. Therefore, the resultant forces on the glass are reduced when the bill path shrinks slightly as an inevitable part of the molding process. In addition, the groove features are retained in the steel tool during cooling further resisting shrinkage of the parent material.

Figure 5:
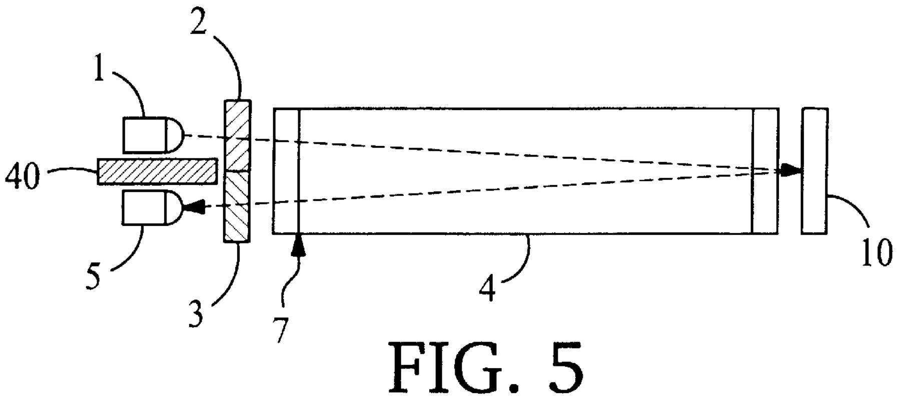
FIG. 5 shows an arrangement using a mirror 10 at one side of the transport path and the two linear polarizers 2 and 3 located on the same side of the bill path. The two polarizers are oriented at 90° in relation to each other.
Figure 6:
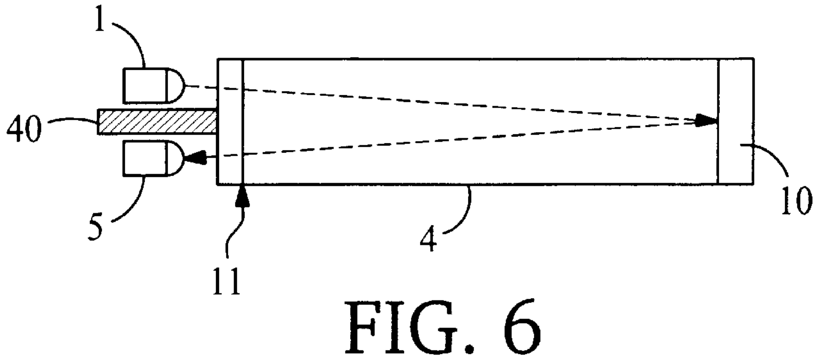
FIG. 6 shows an alternate arrangement using a mirror 10 and a circular polarizer 11 with a source 1 and detector 5 on one side of the transport path, wherein the circular polarizer directly forms the transport path window and there is no window in front of the mirror.

FIGS. 5 and 6 illustrate configurations having the light source 1 and detector 5 on the same side of a bill passageway separated by a light mask 40. In FIG. 5, light from the source 5 passes through a left polarizer 2 and a left window 7, crosses the transport path 4, passes through right window 8 where it reflects off of a mirror 10 back through window 8, again crosses the transport path and passes through left window 7, passes through right polarizer 3 and may impinge upon detector 5. Care needs to be taken in assembling such a configuration to ensure that the windows 7 and 8 do not produce a detrimental birefringence effect with regard to detecting a string.

FIG. 6 is similar to FIG. 5, except that the windows 7 and 8 are not used, and a mirror 10 and a circular polarizer 11 are utilized. The assembly of FIG. 6 can be configured such that, under normal operating conditions, no light reaches the detector 5. But when a string breaks the beam to disturb the polarization angle of the beam, then some light will pass through to the detector 5 and a signal will be generated.

In order to minimize production costs, it may be possible to utilize a commercially manufactured linear polarizer on a glass sheet substrate. This sheet can then be cut to size and used as a combined window and polarizer element. The result would be a simpler, more robust design.

All the solutions described above can be used in a bill validator to detect strings attached to a bill or in a coin acceptor to detect strings attached to a coin.

Location of Bill Path Windows

Figure 12:
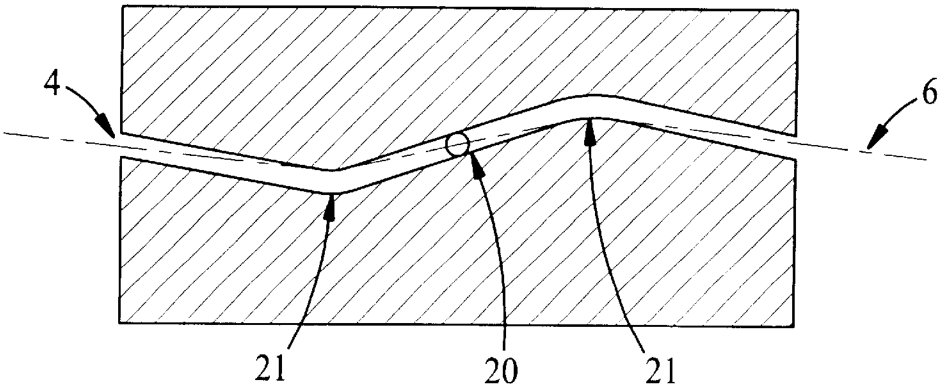
FIG. 12 is a cross-sectional side view of a bill path with a serpentine geometry involving two inflections 21 in the transport path and the location of a cross channel sensor arrangement 20 located between the two inflections.

As a practical matter, it is difficult to make a perfectly uniform and collimated beam of light cross a bill path in such a way that the sensitivity of the system is maintained even when a string appears at the edges of the bill path envelope. Accordingly, an improvement as shown in FIG. 12 has been devised whereby the bill path 4 includes a change of direction (inflections 21). Such a serpentine path ensures that when the string is placed under tension, as it necessarily must be during a fraud attempt, the string presents itself in the central portion of the bill path in the region 20 of the sensor. It is relatively easy to get a good signal from the detection apparatus when the string is in the central area of the bill path.

Multiplication of Signal by Compound Sensors

Figure 13:
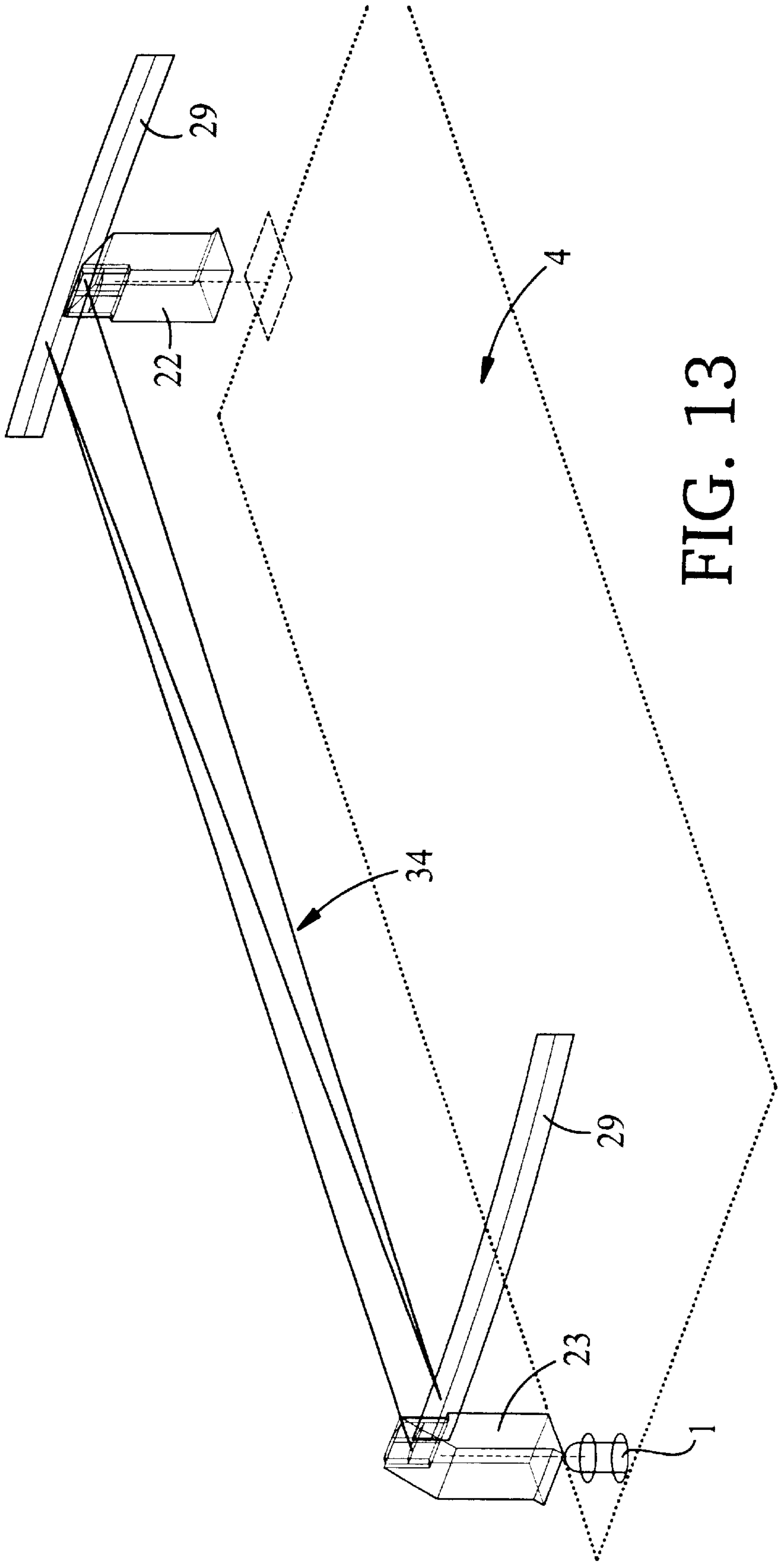
FIG. 13 illustrates a reflective cross-channel sensor arrangement using a cylindrical mirror.

It is further possible to improve the sensitivity of both conventional (non-polarized) string sensors and polarized sensors by using prisms or mirrors to fold the sensor light beam across the bill path multiple times. FIG. 13 is a simplified schematic illustration of a 3-path system using cylindrical mirrors as an example.

In FIG. 13, the beam 34 is reflected to cross the transport path several times. Adaptations of the concept can be contemplated that involve an arbitrary number of passes across the bill path. An important point is that the effect of such a combination is to multiply the transmissivity of the first sensor by the transmissivity of the second and subsequent passes. It may be noted that the effect of sensor noise and calibration errors is also multiplied. However, providing that the signal to noise ratio is positive, the result of such compounding is to increase the signal to noise ratio of the overall system. FIG. 13 shows the use of cylindrical mirrors 29 that are convenient to reduce the overall size of the system, but other shapes can be used such as flat mirrors or spherical mirrors of large radius.

Figure 16B:
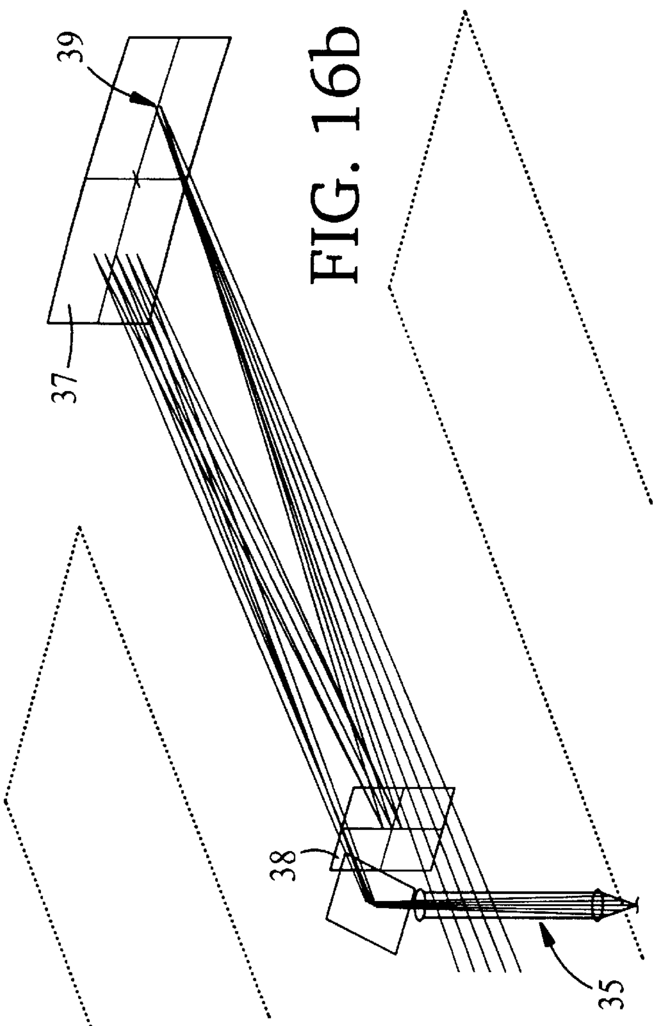
Figure 16A:
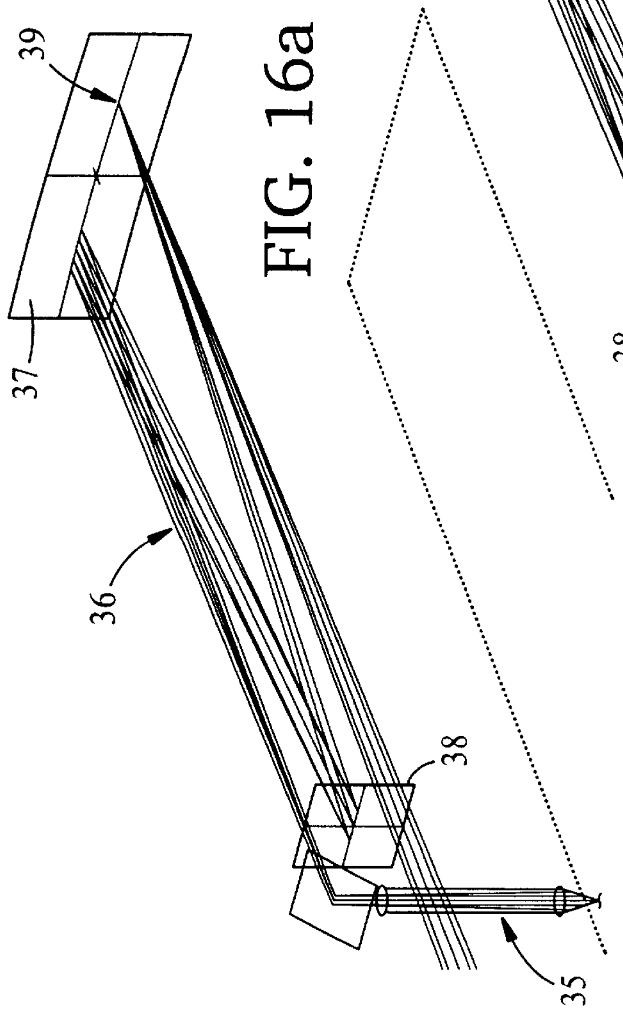

Another advantage of a spherical mirror is apparent in the configuration of FIG. 16*a*, which shows the combination of a flat mirror 38 and a spherical mirror 37. In this arrangement, the beam 36 is leaving the source substantially collimated and directed across the transport path. The optical power of the spherical mirror can be chosen to converge the beam on a focal point 39 to define a suitable location to place a detector (not shown) after reflection on a flat mirror 38, while having a significant length of the transport path traversed with a wide beam. FIG. 16*a* shows a ray tracing in the horizontal plane but FIG. 16*b* illustrates the use of a spherical mirror to similarly focus the beam in the vertical plane. Further, two spherical mirrors on opposite sides of the transport path could be used to combine their power and achieve the same goal. It should also be noted that curved mirrors could also be used to spread the beam across the transport path to increase the probability that any string will be detected.

Prismatic Reflectors

Figure 14A:
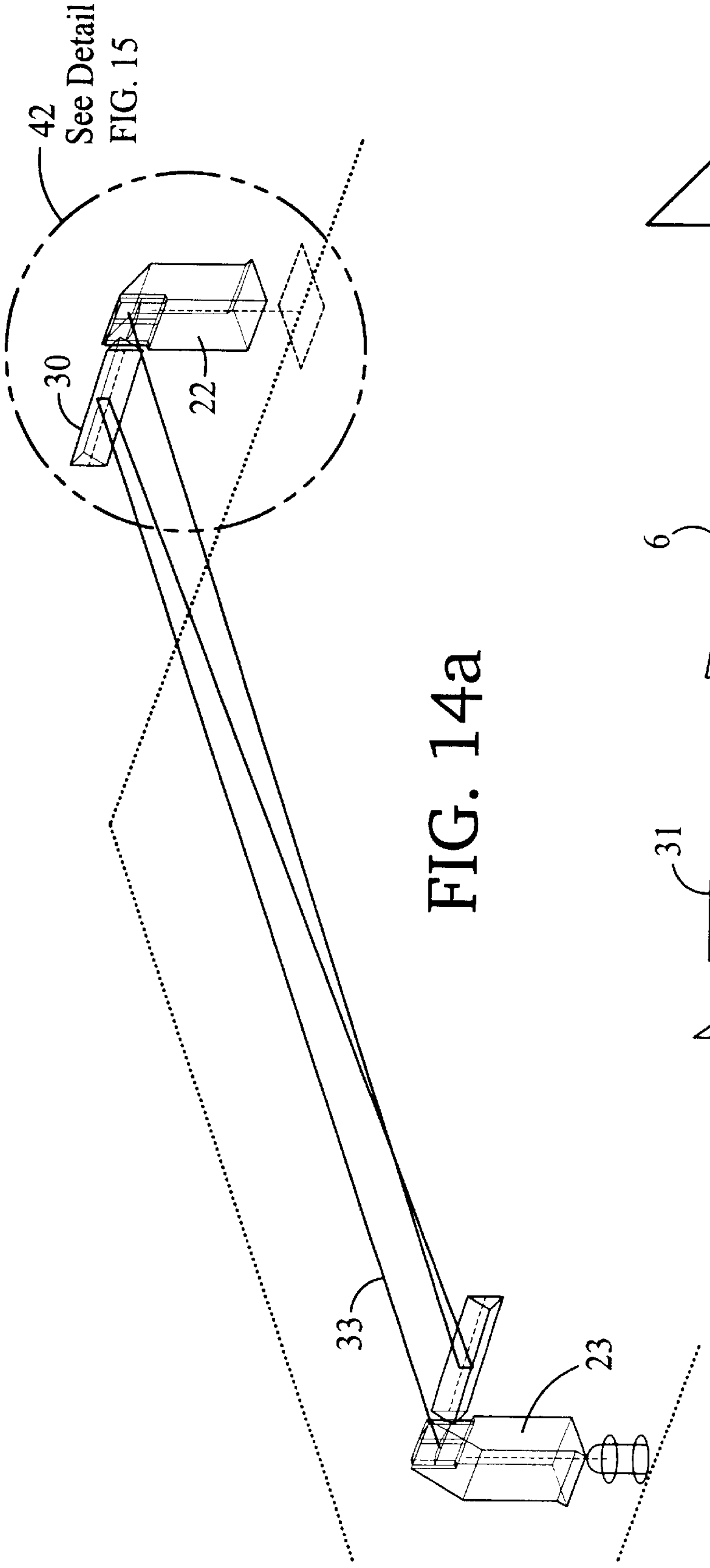
FIG. 14*a* shows a reflective cross-channel sensor arrangement using a prismatic reflector according to the invention.
Figure 15:
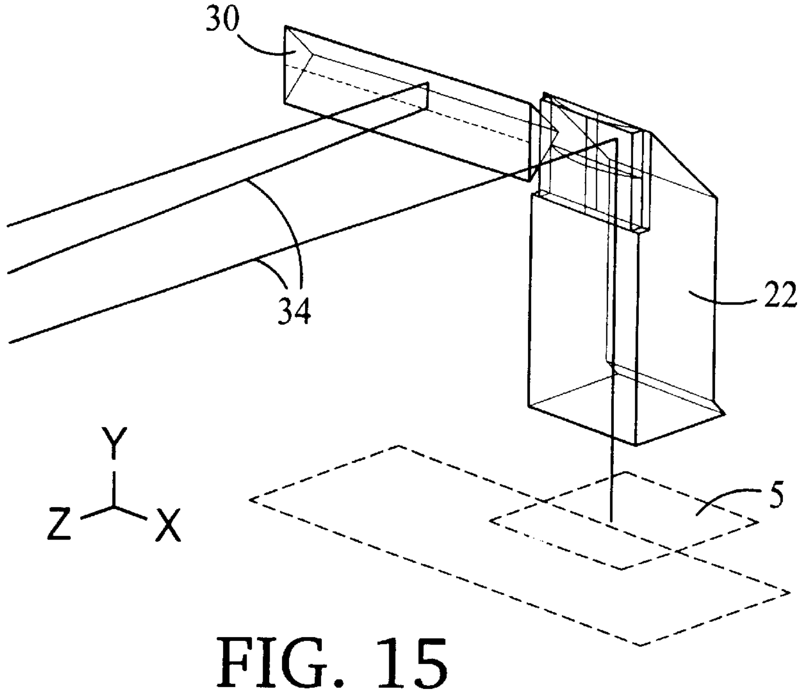
FIG. 15 is an enlarged drawing of the detail section 42 of the prismatic structure and reflected beam of FIG. 14*a*.

An improvement in sensitivity can be achieved by using prismatic reflecting structures as element 30 on FIG. 14*a* and in the detailed section 42 shown in FIG. 15, instead of using flat or cylindrical mirrors. Such a structure can be made of two mirrors arranged to be substantially 90° from each other, or by a total internal reflection (TIR) triangular prism placed horizontally as show on FIG. 15.

Figure 14B:
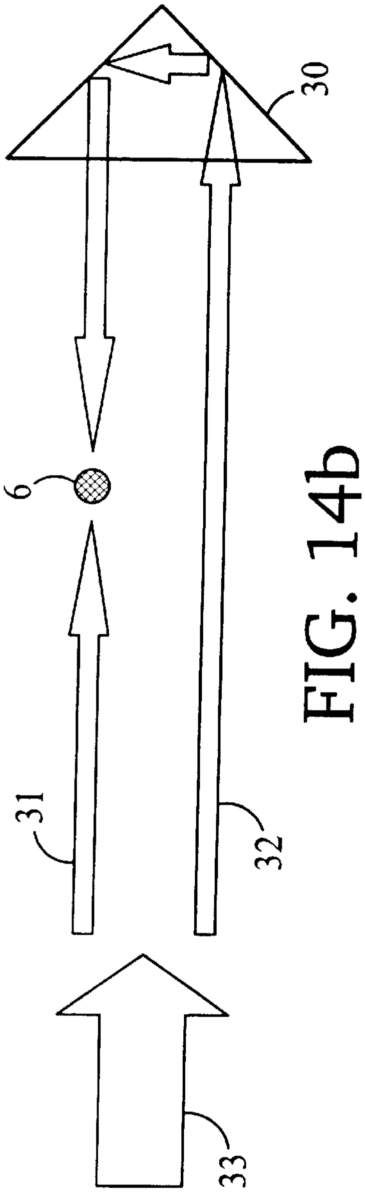
FIG. 14*b* shows the path of reflected section of the beam of FIG. 14*a*.

The advantage of such a structure will be apparent when considering FIG. 14*b*. In the case of a fine string, when using other types of reflectors only part of the total beam 33 from the source is intercepted. But when a prismatic structure is used, the upper part of the beam 31 gets absorbed through the string and is reflected back as a lower part of the beam, and the same holds for the lower beam part 32 being reflected by the triangular prism 30 as an upper beam. This arrangement causes both parts of the beam 31 or 32 to intercept the string, either before reflection by the prism 30 or on the way back from the reflection.

In all the above arrangements, it can be convenient to locate the source and detector component on a single printed circuit board. In that case, it can be convenient to use source and detector prisms 22 and 23 as shown in FIGS. 13, 14 and 15 to direct the light from the component to the transport path.

Figure 14C:
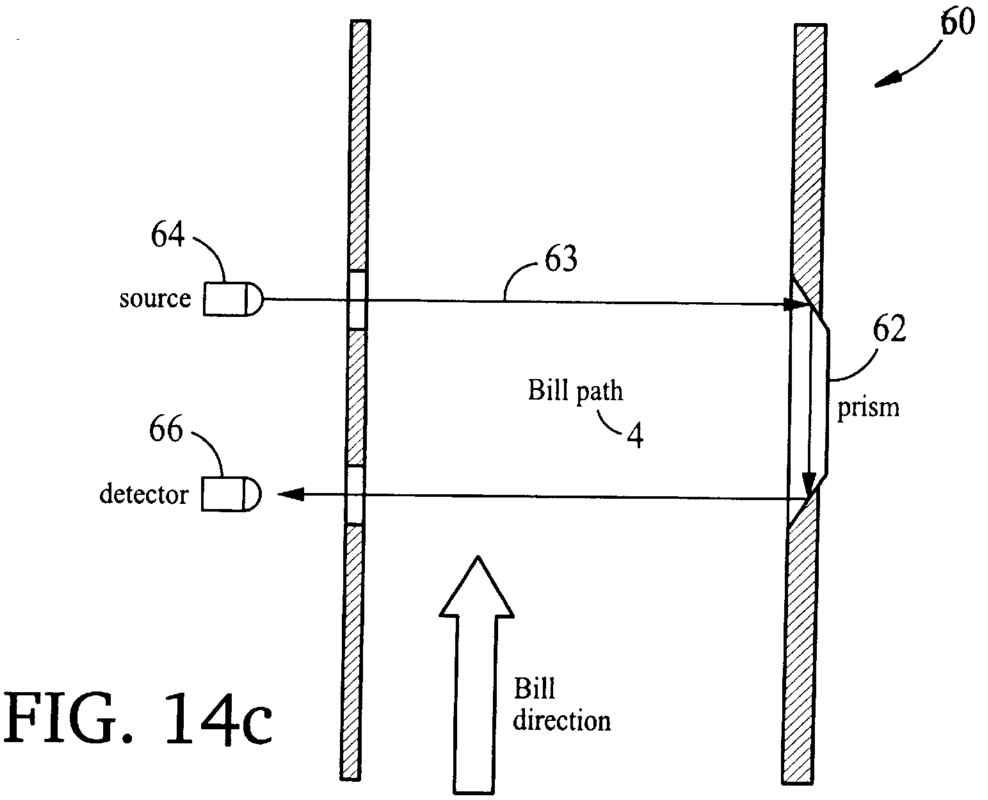
FIG. 14*c* illustrates another implementation of a cross-channel sensor arrangement using a prismatic reflector according to the invention.

FIG. 14*c* illustrates another implementation of an optical detector system 60 that uses a prism 62 to direct light 63 from a source 64 across the bill path 4 to a detector 66. As illustrated, the light beam 63 crosses the bill path in at least two different locations, and the signals generated by the detector 66 may be processed by a currency validator (not shown) to determine if a string or other foreign object is attached to a bill.

Method of Manufacturing Two Crossed Polarizers

Figure 7:
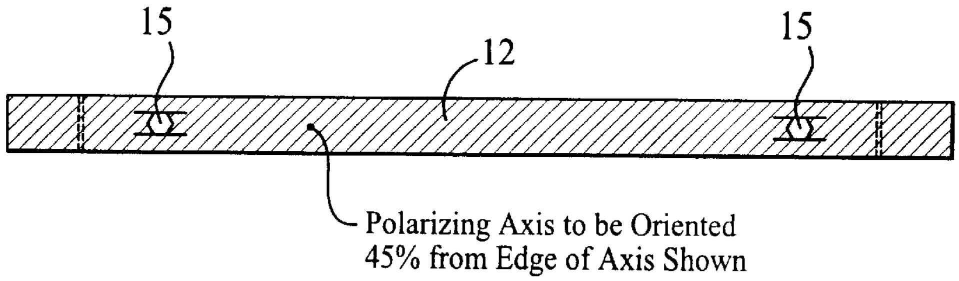
FIG. 7 shows a polarizer strip 12 cut in oriented sheets so that the polarizing axis is at an angle of substantially 45° from the long edge and includes index holes 15.
Figure 8:
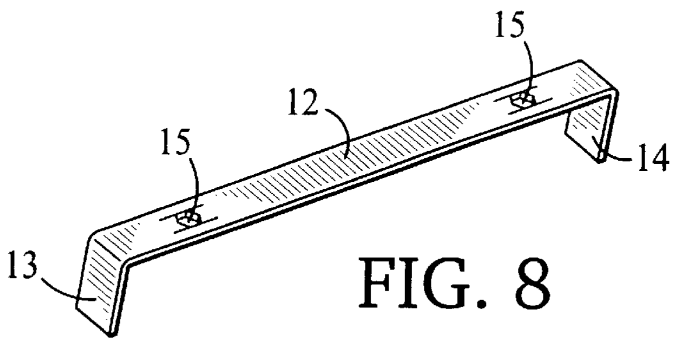
FIG. 8 shows the polarizer strip of FIG. 7 with folded extremities to obtain a substantially 90° crossing of the polarization of the two extremities 13 and 14.
Figure 9:
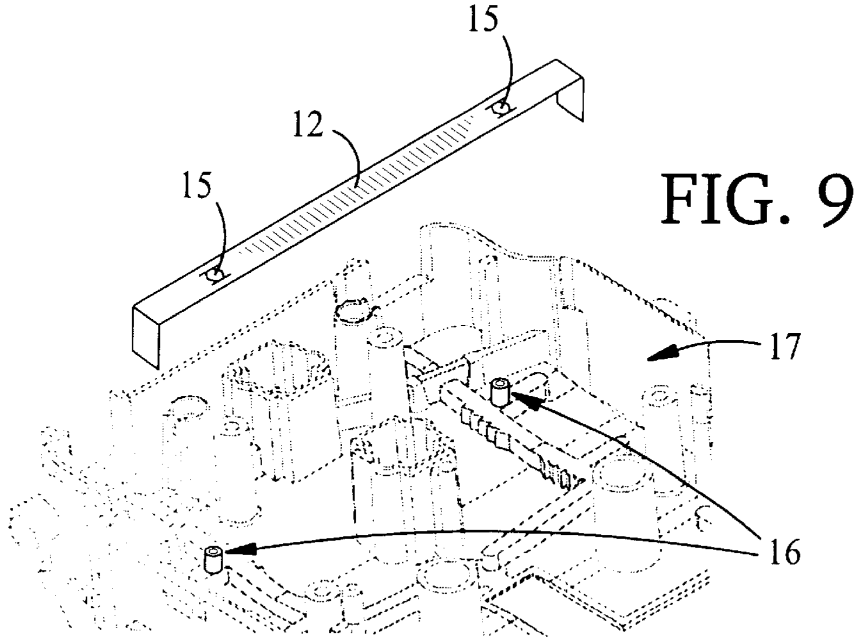
FIG. 9 shows the polarizer strip part 12 positioned for attachment to a chassis 17 assembly wherein holes 15 are indexed on the pins 16.

A convenient way to fabricate the two crossed opposing polarizers 2 and 3 shown in FIG. 1 is to cut a strip 12 in a polarizer sheet at a given angle, 45° when a resulting 90° crossing is desired, as pictured in FIG. 7, and to bend the extremities at right angles as pictured in FIG. 8. Two mounting holes 15 can be used to index the part onto locating pins 16 in the holding chassis 17 as shown in FIG. 9. If desired, two loose parts can be manufactured in the same manner by cutting the strip in two.

Another method for fabricating two crossed opposing polarizers in pairs for use in a currency handling machine is illustrated in FIGS. 17*a* to 17*e*. When a polarizer is cut from a raw sheet material, the orientation of the axis of the linear polarizer may be within + or − 3° relative to the edge of the sheet. Consequently, cutting out polarizers separately in this manner may result in a pair of polarizers that have axis which do not cross at substantially 90°, but may be misaligned by as much as 6°. Such misaligned polarizers would produce unacceptable residual signals when used as part of a string detector system. In order to avoid such misalignment problems, referring to FIG. 17*a*, a polarizer film 70 is cut such that two polarizers 72 and 74 have lines of polarization or axis that are substantially 90° from each other. The polarizers 72 and 74 will thus have polarization axis that cross at substantially 90° from each other when installed in a currency handling system. In this example, the polarization axis is at an angle of substantially 45° from the side 71 of the sheet, but it can be of any angle and the two polarizers will still have polarization axis oriented substantially 90° from each other. It should be understood that ideally the polarization axis of a polarizer would be about 45° to the bill path, or to the horizontal plane of a string attached to a bill, to produce a strong signal when a string is detected. But other polarizer axis orientation angles such as 30° to the bill path would also work, but would generate a weaker signal.

Referring again to FIG. 17*a*, a score line 76 is cut between the polarizers to which enables later separation of the polarizers from each other, and bend line locations 78 may also be scored to facilitate bending each polarizer into shape before installation. Such structure including the score line 76 between the polarizer pair enables the pair to stay together until installation to preserve and guarantee the substantially 90° orientation of their polarization axis to one another.

Figure 17A:
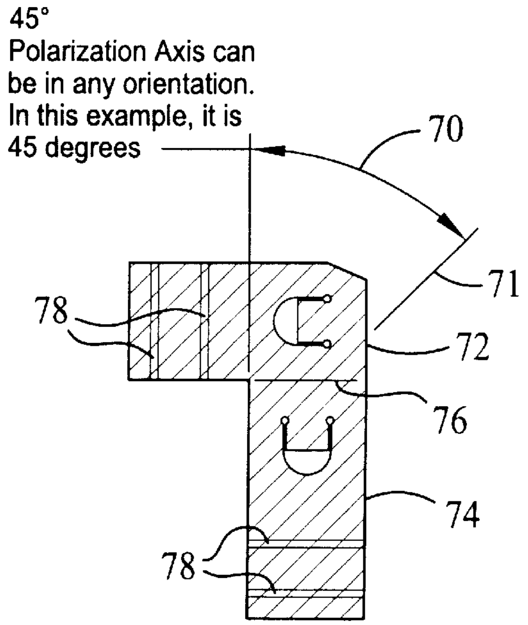
FIGS. 17*a* to 17*e* illustrate an alternate implementation for forming two crossed opposing polarizers from a sheet of polarizing material and seating them in a chassis assembly according to the present invention.
Figure 17B:
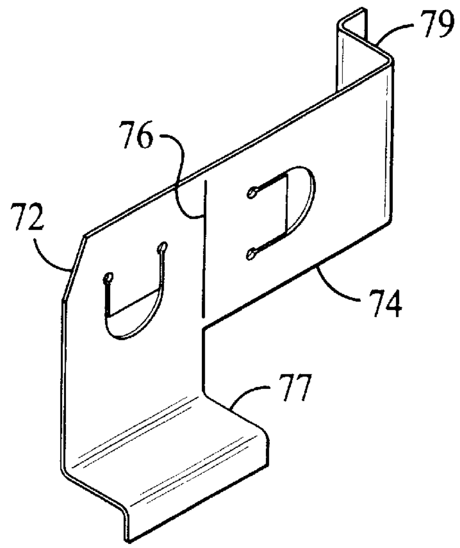
Figure 17C:
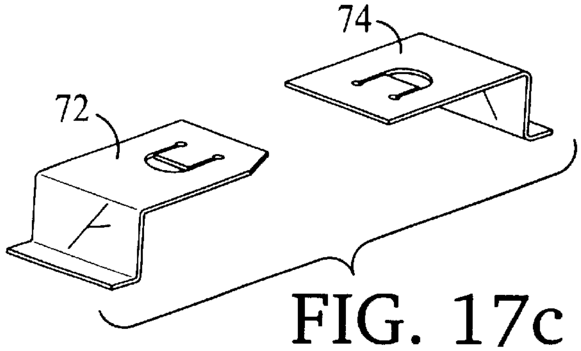
Figure 17D:
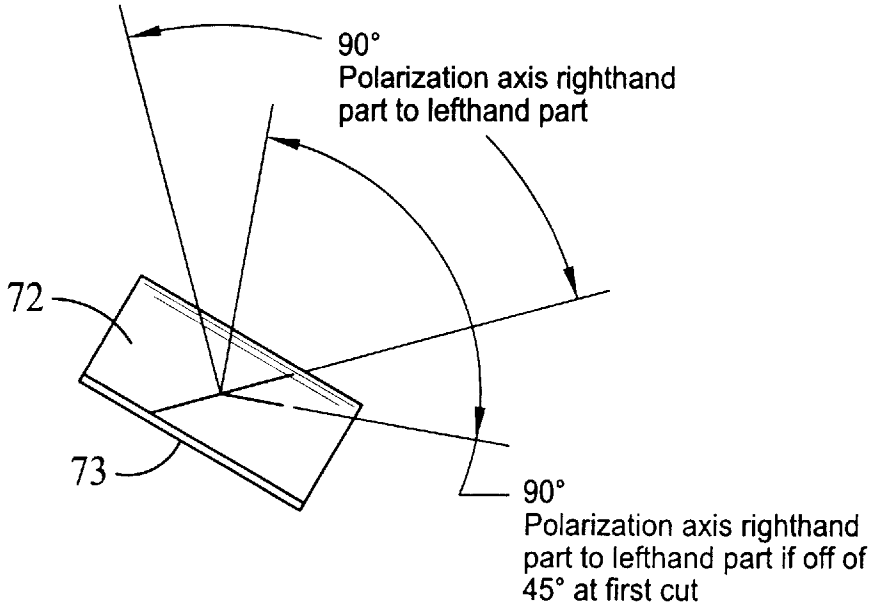

FIG. 17*b* illustrates the first polarizer 72 and second polarizer 74 (polarizer pair) cut from the sheet 70. Leg portions 77 and 79 are formed by bending the polarizing film in opposite directions (up and down). Next, the two polarizers are separated from each other along the score line 76 (shown in FIG. 17C), and the axis of polarization of each part is oriented at substantially 90° from the other. The pair of polarizers will function well even if they were cut such that their polarization axis is not exactly 45° from a horizontal plane that is parallel to the plane of the bill path or of a detected string. This is illustrated in FIG. 17*d*, wherein an end view of polarizer 72 is shown and wherein the polarization axis of the first polarizer 72 (right-hand part) is oriented at an angle of substantially 90° from the polarization axis of the second polarizer 74 (left-hand part), but wherein the polarizers were cut at an angle that was not exactly 45° from an edge 71 of the sheet material (see FIG. 17*a*).

Figure 17E:
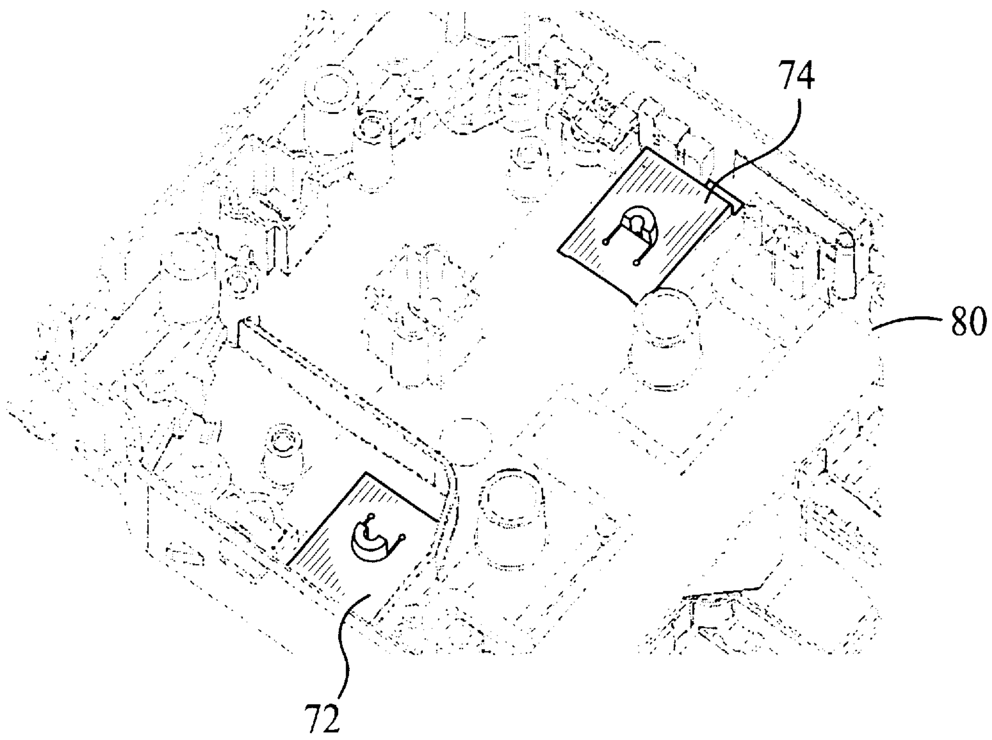

FIG. 17*e* illustrates the polarizer pair (first polarizer 72 and second polarizer 74) seated in a chassis assembly 80 of a bill handling unit. The two polarizers are aligned as shown in FIG. 17*c* so that the polarization axis of each is oriented substantially 90° from the other.

Improved cross-channel sensor configurations and methods of detecting string cheat fraud attempts have been described. It should be understood that many changes, modifications, variations and other uses and applications are possible that do not depart from the spirit and scope of the invention, and such variations fall within the scope of this disclosure and the appended claims.

What is claimed is:

1. A string detector for a currency validator having a transport path comprising:

string fraud detection means arranged along the transport path, wherein the string fraud detection means includes a light source, at least one polarizer active in a limited range of wavelengths, and a detector means to detect a string that causes rotation of the polarization of light passing through the string, wherein a signal in the detector means is indicative of the amount of light whose polarization has been rotated by the presence of the string.

2. The apparatus of claim 1 wherein the detector means comprises a photo detector.

3. The apparatus of claim 2 wherein the photo detector is a polarized detector means.

4. The apparatus of claim 1 wherein the light source is a laser diode.

5. The apparatus of claim 1 wherein the light source is composed of at least an LED and a polarizer.

6. The apparatus of claim 1 comprising two polarizers.

7. The apparatus of claim 6 wherein the two polarizers are linear polarizers.

8. The apparatus of claim 6 wherein the two polarizers are circular polarizers.

9. The apparatus of claim 8 wherein one polarizer is right-handed and the second is left-handed.

10. The apparatus of claim 8 wherein the two polarizers have the same handedness.

11. The apparatus of claim 7 wherein the axis of the two polarizers are crossed at substantially 90°.

12. The apparatus of claim 11 wherein the axis of the polarizers are oriented substantially at 45° to the transport path.

13. The apparatus of claim 6 wherein the polarizers are active in a limited range of wavelengths.

14. The apparatus of claim 13 wherein the polarizers are active in the visible wavelength range and inactive in the IR wavelength range.

15. The apparatus of claim 1, wherein the string fraud detection means includes at least a light source, a detector and at least one polarizer means on one side of a transport path and a reflector on the opposite side, such that polarized light is reflected towards the detector through the polarizer.

16. The apparatus of claim 15 wherein the polarizer is a circular type polarizer.

17. The apparatus of claim 15 comprising two linear polarizer means having axes that are crossed at substantially 90° from each other.

18. The apparatus of claim 15 wherein the light source is at least one of a laser diode, or an LED with a polarizer.

19. The apparatus of claim 15 wherein a single polarizer is used in front of the photo detector having a polarizer axis oriented at substantially 45° to the transport path, and a laser diode light source is oriented to minimize the detected signal in the absence of a string.

20. The apparatus of claim 19 wherein the polarizer is a linear polarizer.

21. The apparatus of claim 1 wherein the string fraud detection means comprises a plurality of light sources and polarizing means, wherein at least one source has a wavelength in a range that is polarized and at least a second light source has a wavelength in a range that is not polarized.

22. The apparatus of claim 21 wherein at least one light source emits light in a visible wavelength range and the second light source emits light in the IR wavelength range.

23. The apparatus of claim 1 wherein the transport path includes at least one transparent window.

24. The apparatus of claim 23 wherein the transparent window is made of at least one of PMMA, cycloaliphatic acrylic, optical grade acrylic (PMMA), allyl diglycol carbonate, modified urethane and glass.

25. The apparatus of claim 23 wherein an optical subassembly forms the transparent window.

26. The apparatus of claim 25 wherein the optical subassembly includes a frame molded around a rectangular transparent insert.

27. The apparatus of claim 26 wherein a low shrink material is used to form the frame.

28. The apparatus of claim 26 wherein the transparent insert is glass.

29. The apparatus of claim 25 wherein the optical subassembly is loaded as an insert into an injection mold tool that forms a portion of the transport path.

30. The apparatus of claim 29 wherein grooves are formed in a portion of the transport path near the location of the optical subassembly to absorb stress due to mold shrinkage.

31. The apparatus of claim 23 further comprising a polarizer.

32. The apparatus of claim 1 wherein the transport path includes at least one window element and polarizer component.

33. The apparatus of claim 1, further comprising sensor means, validation means, comparison means and associated memory means.

34. A method of detecting a transparent string in a currency validator comprising:

illuminating the string with polarized light, wherein the polarization of the light is rotated through the string;

subsequently passing the light through a polarizer; and detecting light from the polarizer to provide a signal indicative of the amount of light whose polarization has been rotated by the presence of the string.

35. The method of claim 34 further comprising detecting the rotated light by transmission through the polarizer.

36. The method of claim 34 further comprising detecting the rotated light by absorption by the polarizer.

37. The method of claim 34 wherein polarized light in a limited range of wavelengths is used to detect a transparent string, and opaque strings are detected with light in another range of wavelengths.

38. The method of claim 37 wherein the transparent string is detected in the visible wavelength range and the opaque string is detected in the IR wavelength range.

39. The method of claim 34 wherein a signal is measured to detect the presence of a string.

40. The method of claim 39 wherein the signal is compared to a reference value stored in memory.

41. The method of claim 39 wherein the measured signal is compared to a signal in absence of a string by comparing the ratio of the measurements to a reference threshold.

42. The method of claim 39 further comprising:

determining a baseline signal value by measuring a signal in the absence of a string;

storing the baseline signal value in a memory;

determining a foreign object signal value by measuring a signal when a foreign object is detected;

obtaining a difference value by subtracting the foreign object signal value and the baseline value from each other; and comparing the difference value to a reference value stored in the memory.

43. The method of claim 42 further comprising:

determining that a substantially transparent string has been detected if the difference value is positive; and detecting that a substantially opaque string has been detected if the difference value is negative.

44. The method of claims 40, 41 or 42 wherein the reference value is defined by statistical measurement of a plurality of measurements, in the presence or in the absence of the string, computing a mean value and a standard deviation, and defining a reference value substantially equal to the mean value + or − n standard deviations.

45. The method of claim 44 wherein n is between 0 and 5.

46. A method of making cross polarizers comprising:

cutting a rectangular strip of polarizer material oriented at substantially 45° of the fast axis of the polarizer; and folding the extremities of the strip at a right angle to form two polarizers having their axis crossed at substantially 90°.

47. A currency validator comprising a currency transport path having at least one serpentine portion so that a taut string object will be positioned near a central region, sensor means, validation means, comparison means, memory means and fraud detection means, wherein the fraud detection means uses at least one light beam to detect a string in at least the serpentine portion, and wherein the light beam traverses a portion of the currency transport path a plurality of times.

48. The apparatus of claim 47 wherein at least one reflective structure on the side of the transport path is used.

49. The apparatus of claim 48 wherein the reflective structure is at least one of flat, cylindrical, or spherical in shape, or a combination thereof.

50. The apparatus of claim 48 wherein prismatic reflectors are used.

51. A method for detecting a string in a currency validator comprising:

illuminating the string with non-polarized light to obtain a first signal;

illuminating the string with polarized light to obtain a second signal indicative of the amount of light whose polarization has been rotated by the presence of the string; and comparing the first and second signals to obtain information.

52. The method of claim 51 wherein the information is obtained in a single signal device.

53. The method of claim 52 wherein the signal device is at least one of an analog hardware device, and an analog-to-digital converter connected to a digital signal processor.

54. The method of claim 51 wherein the information obtained is derived from correlated changes of the signal levels of the first and second signals.

* * * * *